US012609857B2

(12) United States Patent
Dai et al.

(10) Patent No.: US 12,609,857 B2
(45) Date of Patent: Apr. 21, 2026

(54) DOWNLINK SIGNAL RECEIVING METHOD, TERMINAL, AND SOURCE BASE STATION

(71) Applicant: HUAWEI TECHNOLOGIES CO., LTD., Shenzhen (CN)

(72) Inventors: Xizeng Dai, Beijing (CN); Hong Wang, Beijing (CN); Jian Zhang, Shenzhen (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/665,497

(22) Filed: May 15, 2024

(65) Prior Publication Data

US 2024/0306063 A1 Sep. 12, 2024

Related U.S. Application Data

(63) Continuation of application No. 17/332,580, filed on May 27, 2021, now abandoned, which is a
(Continued)

(51) Int. Cl.
*H04W 36/08* (2009.01)
*H04L 27/26* (2006.01)
(Continued)

(52) U.S. Cl.
CPC ..... *H04L 27/265* (2013.01); *H04W 36/00692* (2023.05); *H04W 36/0072* (2013.01);
(Continued)

(58) Field of Classification Search
CPC ................ H04L 27/265; H04L 5/001; H04W 36/00692; H04W 36/0072; H04W 36/18;
(Continued)

(56) References Cited

U.S. PATENT DOCUMENTS 6,885,851 B1 * 4/2005 Miura .................. H03G 3/3052
455/235.1
9,451,522 B2 * 9/2016 Timus ................... H04L 5/0073
(Continued)

FOREIGN PATENT DOCUMENTS

CN 101827408 A 9/2010
CN 106255223 A 12/2016
(Continued)

OTHER PUBLICATIONS

3GPP TS 38.213 V15.3.0, "3rd Generation Partnership Project; Technical Specification Group Radio Access Network; NR; Physical layer procedures for control (Release 15)," Sep. 2018, 101 pages.
(Continued)

*Primary Examiner* — Atique Ahmed
(74) *Attorney, Agent, or Firm* — Fish & Richardson P.C.

(57) ABSTRACT

This application provides a downlink signal receiving method, a terminal, and a source base station. The method includes: sending a first capability indication to a source base station, wherein the first capability indication indicates that the terminal has an intra-frequency receiving capability; in response to the first capability indication, receiving a first message from the source base station, wherein the first message comprises a first indication, and the first indication indicates the terminal to receive, during a handover process, a downlink signal from the source base station and a downlink signal from a target base station, wherein the downlink signal from the source base station and the downlink signal from the target base station have a same frequency; and receiving during the handover process, the downlink signal from the source base station and the downlink signal from the target base station based on the first indication.

18 Claims, 5 Drawing Sheets

Related U.S. Application Data continuation of application No. PCT/CN2018/118722, filed on Nov. 30, 2018.

(51) Int. Cl.

| | |
|---|---|
| *H04W 36/00* | (2009.01) |
| *H04W 36/18* | (2009.01) |
| *H04W 36/24* | (2009.01) |
| *H04W 52/52* | (2009.01) |

(52) U.S. Cl.

CPC ......... *H04W 36/18* (2013.01); *H04W 36/249* (2023.05); *H04W 52/52* (2013.01); *H04W 36/08* (2013.01)

(58) Field of Classification Search

CPC ... H04W 36/249; H04W 52/52; H04W 36/08; H04W 52/146; H04W 52/242; H04W 52/247; H04W 52/40

See application file for complete search history.

(56) References Cited

U.S. PATENT DOCUMENTS

| | | | | |
|---|---|---|---|---|
| 10,462,723 | B2* | 10/2019 | Zhang | H04W 36/0027 |
| 2004/0129862 | A1 | 7/2004 | McTaggart | |
| 2008/0039057 | A1* | 2/2008 | Worrall | H04W 72/30 |
| | | | | 455/414.1 |
| 2012/0071127 | A1* | 3/2012 | Tsukamoto | H03G 3/3052 |
| | | | | 455/234.1 |
| 2013/0201959 | A1 | 8/2013 | Guo et al. | |
| 2013/0308055 | A1* | 11/2013 | Shigemasa | H04N 7/152 |
| | | | | 348/563 |
| 2013/0309988 | A1* | 11/2013 | Ji | H03G 3/3078 |
| | | | | 455/234.1 |
| 2014/0016689 | A1* | 1/2014 | Dua | H04B 7/0854 |
| | | | | 375/232 |
| 2014/0098779 | A1* | 4/2014 | Kim | H04W 72/1273 |
| | | | | 370/329 |
| 2014/0206341 | A1* | 7/2014 | Siomina | H04W 36/0085 |
| | | | | 455/422.1 |
| 2014/0355507 | A1 | 12/2014 | Amerga et al. | |
| 2015/0195032 | A1* | 7/2015 | Sharma | H04B 7/15592 |
| | | | | 370/315 |
| 2016/0381611 | A1* | 12/2016 | Uchino | H04W 36/0061 |
| | | | | 370/331 |
| 2018/0092085 | A1* | 3/2018 | Shaheen | H04W 36/0094 |
| 2018/0220336 | A1 | 8/2018 | Hong et al. | |
| 2018/0248736 | A1* | 8/2018 | Davydov | H04J 11/0079 |
| 2020/0107235 | A1* | 4/2020 | Peisa | H04B 7/0617 |
| 2020/0329503 | A1* | 10/2020 | Da Silva | H04W 74/0838 |
| 2021/0029605 | A1* | 1/2021 | Kadiri | H04W 36/085 |

FOREIGN PATENT DOCUMENTS

| | | |
|---|---|---|
| CN | 106937336 A | 7/2017 |
| CN | 107135674 A | 9/2017 |
| CN | 108112041 A | 6/2018 |
| KR | 20140022033 A | 2/2014 |
| WO | 2012128546 A2 | 9/2012 |
| WO | 2018062457 A1 | 4/2018 |

OTHER PUBLICATIONS

3GPP TS 38.300 V15.3.1, "3rd Generation Partnership Project; Technical Specification Group Radio Access Network; NR; NR and NG-RAN Overall Description; Stage 2 (Release 15)," Oct. 2018, 92 pages.

3GPP TS 38.306 V15.3.0, "3rd Generation Partnership Project; Technical Specification Group Radio Access Network; NR; User Equipment (UE) radio access capabilities (Release 15)," Sep. 2018, 31 pages.

3GPP TS 38.331 V15.3.0 (Sep. 2018), "3rd Generation Partnership Project; Technical Specification Group Radio Access Network; NR; Radio Resource Control (RRC) protocol specification (Release 15)," Sep. 2018, 451 pages.

Extended European Search Report issued in European Application No. 18941294.3 on Feb. 3, 2022, 23 pages.

Huawei, HiSilicon, "Close to 0 ms HO interruption time for single Tx/Rx UE," 3GPP TSG-RAN WG2 #97bis, R2-1703382, Spokane, USA, Apr. 3-7, 2017, 8 pages.

Huawei, HiSilicon, "Discussion on incoming LS from RAN2 on DC-related mobility enhancements in NR," 3GPP TSG-RAN WG4 Meeting NR #2, R4-1706723, Qingdao, China, Jun. 27-29, 2017, 5 pages.

Huawei, HiSilicon, and AT&T, "DC for intra-frequency mobility in NR,"3GPP TSG-RAN WG2 #101, R2-1802475, Athens, Greece, Feb. 26-Mar. 2, 2018, 3 pages.

Intel Corporation, "Handover based on DC with dual radio support," 3GPP TSG RAN WG2 Meeting #97bis, R2-1703416, Spokane, USA, Apr. 3-7, 2017, 5 pages.

International Search Report and Written Opinion in International Application No. PCT/CN2018/118722, dated Aug. 1, 2019, 33 pages.

Office Action issued in Indian Application No. 202137029283 on Mar. 7, 2022, 6 pages.

Qualcomm Incorporated, "NR Oms Interruption HO," 3GPP TSG-RAN WG2 Meeting #101, R2-1803662, Athens, Greece, Feb. 26-Mar. 2, 2018, 8 pages.

* cited by examiner

500

600

DOWNLINK SIGNAL RECEIVING METHOD, TERMINAL, AND SOURCE BASE STATION

CROSS-REFERENCE TO RELATED APPLICATIONS

This application is a continuation of U.S. patent application Ser. No. 17/332,580, filed on May 27, 2021, which is a continuation of International Application No. PCT/CN2018/118722, filed on Nov. 30, 2018. All of the afore-mentioned patent applications are hereby incorporated by reference in their entireties.

TECHNICAL FIELD

This application relates to the field of communications technologies, and in particular, to a downlink signal receiving method, a terminal, and a source base station.

BACKGROUND

When a terminal moves from a cell (source cell) to another cell (a target cell), a handover procedure may be triggered. In a time period from handover start to handover completion, the terminal no longer receives a downlink signal from the source cell, and the terminal does not receive a downlink signal from the target cell. Consequently, downlink signal transmission is interrupted.

However, with an increase in service types, a sharp increase in service data volume, and an increase in a moving speed of a terminal, requirements on service interruption time and reliability in a handover process are increasingly strict. For example, mobile office, mobile video services, vehicle wireless control, train wireless control, and the like require zero or nearly zero service interruption.

Therefore, downlink signal transmission interruption in the handover process is a problem that urgently needs to be resolved currently.

SUMMARY

This application provides a downlink signal receiving method, a terminal, and a source base station, to resolve a problem of downlink signal transmission interruption in a handover process.

According to a first aspect, this application provides a downlink signal receiving method, applied to a process in which a terminal is handed over from a source base station to a target base station, where the method includes: The terminal receives a first message from the source base station, where the first message includes a first indication, and the first indication is used to indicate the terminal to receive downlink signals on a same frequency, in other words, indicate to receive downlink signals from the source base station and the target base station on a same carrier frequency. The terminal receives the downlink signals from the source base station and the target base station based on the first indication.

Based on this solution, the terminal may receive the downlink signals from the source base station and the target base station in a handover process. For example, when the terminal needs to receive the downlink signal from the target base station while receiving the downlink signal from the source base station in the handover process, the terminal receives the downlink signals from the source base station and the target base station. When receiving no downlink signal from the target base station, the terminal receives the downlink signal (where the downlink signal carries downlink data) only from the source base station. In addition, after handover is completed, the terminal receives the downlink signal (where the downlink signal carries downlink data) only from the target base station, so that the terminal can still receive the downlink signal from the source base station in the handover process. Therefore, downlink signal transmission interruption caused by the handover process may be reduced to 0 ms or nearly 0 ms. In other words, zero interruption or nearly zero interruption of data transmission may be implemented.

In a possible implementation, that the terminal receives the downlink signals from the source base station and the target base station based on the first indication includes: The terminal configures at least two processing resources based on the first indication, where one processing resource includes a baseband resource and a fast Fourier transformation FFT, and at least two processing resources correspond to a same carrier frequency. The terminal receives the downlink signal from the source base station by using a first processing resource in the at least two processing resources. The terminal receives the downlink signal from the target base station by using a second processing resource in the at least two processing resources, where the first processing resource is different from the second processing resource.

In a possible implementation, if the terminal has a carrier aggregation capability, a bandwidth of a baseband resource included in the first processing resource is the same as a bandwidth of a baseband resource included in the second processing resource, and a size of an FFT corresponding to the first processing resource is the same as a size of an FFT corresponding to the second processing resource. Alternatively, if the terminal does not have a carrier aggregation capability, a bandwidth of a baseband resource included in the second processing resource is less than or equal to a bandwidth of a baseband resource included in the first processing resource, and a size of an FFT corresponding to the second processing resource is less than or equal to a size of an FFT corresponding to the first processing resource, where the bandwidth of the baseband resource included in the second processing resource is less than or equal to a preset bandwidth threshold.

In a possible implementation, the terminal sends a first capability indication to the source base station, where the first capability indication is used to indicate that the terminal has an intra-frequency receiving capability.

In a possible implementation, the terminal does not adjust an automatic gain control AGC gain based on the first indication. Alternatively, the first message further includes a second indication, and the terminal does not adjust an AGC gain based on the second indication.

In a possible implementation, the terminal sends a second capability indication to the source base station, where the second capability indication is used to indicate that the terminal has a capability of not adjusting the AGC gain.

In a possible implementation, the first indication is further used to indicate a fading margin, and the terminal sets a fixed AGC gain based on the fading margin.

Alternatively, the terminal sets a fixed AGC gain based on a fading margin, where the first message further includes a third indication, and the third indication is used to indicate the fading margin.

In a possible implementation, the terminal sends a third capability indication to the source base station, where the third capability indication is used to indicate that the terminal has a capability of setting the fixed AGC gain based on the fading margin.

In a possible implementation, the first message further includes a start time point. That the terminal receives the downlink signals from the source base station and the target base station based on the first indication includes: The terminal starts to receive, at the start time point, the downlink signals from the source base station and the target base station based on the first indication.

In a possible implementation, the first message further includes an end time point, and the terminal stops, at the end time point, receiving the downlink signals from the source base station and the target base station.

Alternatively, the first message further includes first duration. After the first duration from the start time point, the terminal stops receiving the downlink signals from the source base station and the target base station.

In a possible implementation, the first message is a radio resource control RRC connection reconfiguration message.

According to a second aspect, this application provides a downlink signal receiving method, applied to a process in which a terminal is handed over from a source base station to a target base station, where the method includes: The source base station generates a first message, where the first message includes a first indication, and the first indication is used to indicate the terminal to receive downlink signals on a same frequency, in other words, indicate to receive downlink signals from the source base station and the target base station on a same carrier frequency. The source base station sends the first message to the terminal.

Based on this solution, the terminal may receive the downlink signals from the source base station and the target base station in a handover process. For example, when the terminal needs to receive the downlink signal from the target base station while receiving the downlink signal from the source base station in the handover process, the terminal receives the downlink signals from the source base station and the target base station. When receiving no downlink signal from the target base station, the terminal receives the downlink signal (where the downlink signal carries downlink data) only from the source base station. In addition, after handover is completed, the terminal receives the downlink signal (where the downlink signal carries downlink data) only from the target base station, so that the terminal can still receive the downlink signal from the source base station in the handover process. Therefore, downlink signal transmission interruption caused by the handover process may be reduced to 0 ms or nearly 0 ms. In other words, zero interruption or nearly zero interruption of data transmission may be implemented.

In a possible implementation, the source base station receives a first capability indication from the terminal, where the first capability indication is used to indicate that the terminal has an intra-frequency receiving capability.

In a possible implementation, the first indication is further used to indicate the terminal not to adjust an AGC gain, or the first message further includes a second indication, and the second indication is used to indicate the terminal not to adjust an AGC gain.

In a possible implementation, the source base station receives a second capability indication from the terminal, where the second capability indication is used to indicate that the terminal has a capability of not adjusting the AGC gain.

In a possible implementation, the first indication is further used to indicate a fading margin. In this way, the terminal can set a fixed AGC gain based on the fading margin. Alternatively, the first message further includes a third indication, and the third indication is used to indicate a fading margin, so that the terminal may set a fixed AGC gain based on the fading margin.

In a possible implementation, the source base station receives a third capability indication from the terminal, where the third capability indication is used to indicate that the terminal has a capability of setting the fixed AGC gain based on the fading margin.

In a possible implementation, the first message further includes a start time point, so that the terminal may start, at the start time point, to receive the downlink signals from the source base station and the target base station based on the first indication.

In a possible implementation, the first message further includes an end time point, so that the terminal can stop, at the end time point, receiving the downlink signals from the source base station and the target base station. Alternatively, the first message further includes first duration, so that after the first duration from the start time point, the terminal can stop receiving the downlink signals from the source base station and the target base station.

In a possible implementation, the first message is a radio resource control RRC connection reconfiguration message.

According to a third aspect, this application provides a communications apparatus. The communications apparatus has a function of implementing the terminal or the access network device in the foregoing method embodiments. The function may be implemented by hardware, or may be implemented by hardware executing corresponding software. The hardware or the software includes one or more units or modules corresponding to the foregoing function.

In a possible design, the communications apparatus includes a processor, a memory, a bus, and a communications interface, where the memory stores computer-executable instructions, the processor is connected to the memory through the bus, and when the communications apparatus runs, the processor executes the computer-executable instructions stored in the memory; so that the communications apparatus performs the downlink signal receiving method according to any one of the first aspect or the implementations of the first aspect, or performs the downlink signal receiving method according to any one of the second aspect or the implementations of the second aspect. For example, the communications apparatus may be a terminal, a base station, or the like.

In another possible design, the communications apparatus may alternatively be a chip, for example, a chip of a terminal or a chip of a source base station. The chip includes a processing unit, and optionally, further includes a storage unit. The chip may be configured to perform the downlink signal receiving method according to any one of the first aspect or the implementations of the first aspect, or perform the downlink signal receiving method according to any one of the second aspect or the implementations of the second aspect.

According to a fourth aspect, this application provides a computer storage medium, storing computer software instructions used by the foregoing terminal, where the computer software instructions include a program designed to perform any one of the foregoing aspects.

According to a fifth aspect, this application provides a computer program product. The computer program product includes computer software instructions, where the computer software instructions may be loaded by using a processor to implement the procedure of the downlink signal receiving method in any one of the foregoing aspects.

DESCRIPTION OF EMBODIMENTS

Figures 1A, 1B:
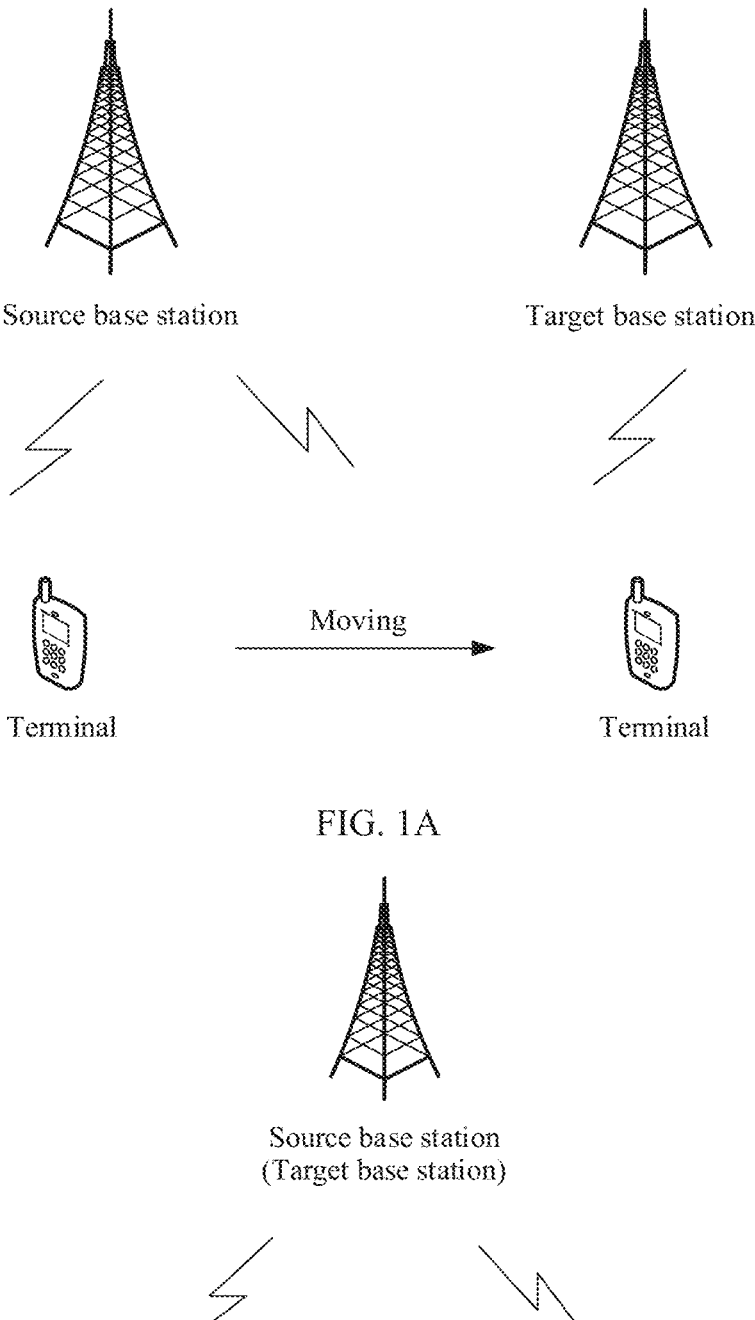
FIG. 1A is a schematic diagram of a possible application scenario according to this application.
FIG. 1B is a schematic diagram of a possible application scenario according to this application.

A base station includes but is not limited to a BBU, a transmission reception point (TRP), a transmission point (TP), a mobile switching center, and the like.

It should be noted that in this application, a "handover" scenario sometimes means that a terminal is handed over from a source cell to a target cell, or sometimes means that a terminal is handed over from a source base station to a target base station. The two cases have a same meaning, and are alternately used in this application. This is centrally described herein. In addition, in this application, the "handover" scenario sometimes means that the terminal receives information (for example, a downlink signal) from the source base station/target base station, and the terminal sends information (for example, an uplink signal) to the source base station/target base station, or sometimes means that the terminal receives information (for example, a downlink signal) from the source cell/target cell, and the terminal sends information (for example, an uplink signal) to the source cell/the target cell. The two cases have a same meaning, and are alternately used in this application. This is centrally described herein.

That is, in this application, the source base station and the source cell have a same meaning, and the target base station and the target cell have a same meaning.

With an increase in service types, a sharp increase in service data volume, and an increase in a moving speed of the terminal, requirements on service interruption time and reliability in a handover process are increasingly strict. For example, mobile office, mobile video services, vehicle wireless control, train wireless control, and the like require zero interruption in service transmission.

In a conventional technology, in a procedure in which the terminal is handed over from the source base station to the target base station, after receiving a handover command (HO command) from the source base station, the terminal stops sending information on an uplink (UL) to the source base station, starts to search for the target base station, and synchronizes time and frequency with the target base station. Then, the terminal initiates a random access process to the target base station. In the random access process, the terminal first obtains an occasion at which the terminal sends a random access preamble to the target base station, in other words, an occasion of a physical random access channel (PRACH). When the occasion arrives, the terminal sends the Preamble (which is denoted as Message1, Msg1 for short) to the target base station. Then, the terminal monitors a physical downlink control channel (PDCCH) scrambled by using a random access radio network temporary identifier (RA-RNTI), where the PDCCH is used to schedule a random access response (RAR) message (which is denoted as Message2, Msg2 for short). The RAR message includes uplink timing advance (TA) and an uplink resource grant (UL grant). Finally, the terminal sends a handover complete (HO complete) message (which is denoted as Message3, Msg3 for short) to the target base station by using the UL grant and the TA. The handover command may be mobility control information, and is included in a radio resource control (RRC) connection reconfiguration message. The handover complete message may be an RRC connection reconfiguration complete message.

In the foregoing process in which the terminal is handed over from the source base station to the target base station, after receiving the handover command from the source base station, the terminal needs to process the command, and then stops sending an uplink signal to the source base station and stops receiving a downlink signal from the source base station. If the terminal has detected the target cell, and has information such as time synchronization and a cell identifier (cell ID) of the target cell, the terminal does not need to perform cell search including synchronization again. If the terminal does not have the foregoing information of the target cell, or the foregoing information had by the terminal is invalid, the terminal needs to perform cell search again. The terminal also needs to complete accurate time and frequency synchronization with the target cell, that is, the fine synchronization. In addition, the terminal further needs to update related configuration information of a media access control (MAC) layer and a higher layer, and is ready to receive a signal from the target base station. In a scenario in which a random access channel (RACH) procedure needs to be performed, the terminal initiates a RACH process. After receiving the Msg3, the terminal may start to send an uplink signal to the target base station, and receive a downlink signal from the target base station.

In the foregoing processes, processing of the handover command, the cell search, fine synchronization, update of MAC layer/higher layer parameters, and the RACH process cause transmission interruption of the uplink and downlink signals. That is, data transmission interruption in a cell handover process is caused. To be specific, in a time period from handover start to handover completion, the terminal no longer sends the uplink signal to the source base station, and does not receive the downlink signal from the source base station. In addition, the terminal neither sends an uplink signal to the target base station, nor receives a downlink signal from the target base station. The data transmission interruption includes uplink signal transmission interruption and downlink signal transmission interruption.

To resolve the foregoing problem of downlink signal transmission interruption, the 3rd generation partnership project (3GPP) Rel-14 proposes a handover time shortening technology (for example, a make-before-break technology or an RACH-less technology). According to the 3GPP protocol 36.133, an interruption time period caused by the technology is still up to 5 ms. In other words, this technology cannot well solve the problem of downlink signal transmission interruption. In addition, this technology does not resolve interruption caused by the fine synchronization.

In addition, the RACH-less technology in the handover time shortening technology has a limitation: The technology requires that the source cell and the target cell need to be synchronized, in other words, a subframe boundary delay difference between the source cell and the target cell is fixed and less than a specific value, for example, 3 microseconds (μs). When this technology is used, the terminal sends a signal to the source cell and the target cell by using a same TA. Such a requirement is not applicable to a typical long term evolution (LTE) frequency division duplex (FDD) asynchronous deployment scenario, another FDD deployment scenario, or a synchronization scenario in which a delay difference is relatively large.

It should be noted that, in this application, the uplink signal includes but is not limited to uplink data, uplink signaling, an uplink message, and an uplink feedback for a downlink signal. The downlink signal includes but is not limited to: downlink data, downlink signaling, a downlink message, and a downlink feedback for an uplink signal.

Figure 2:
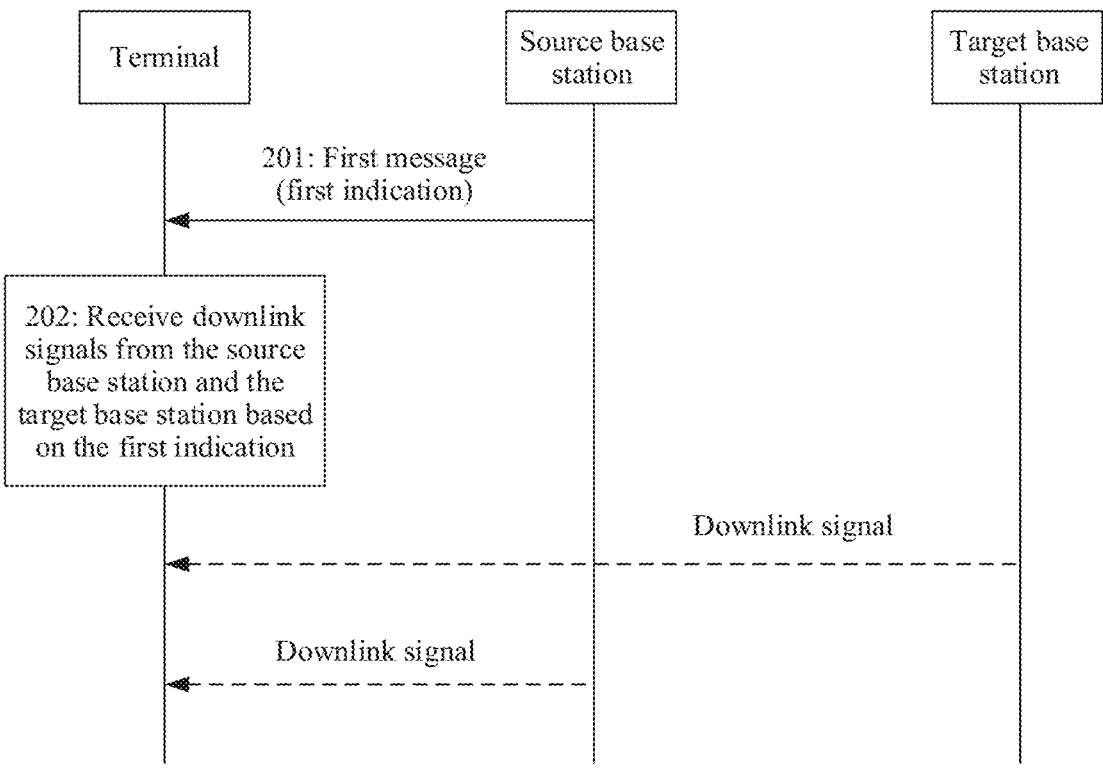
FIG. 2 is a schematic diagram of a downlink signal receiving method according to this application.

To resolve the problem of downlink signal transmission interruption caused by the handover process in the conventional technology, as shown in FIG. 2, this application provides a downlink signal receiving method. The method includes the following steps.

Step 201: A source base station sends a first message to a terminal. Correspondingly, the terminal may receive the first message.

The first message includes a first indication. The first indication is used to indicate the terminal to receive downlink signals on a same frequency. To be specific, the first indication is used to indicate the terminal to receive downlink signals from the source base station and a target base station on a same carrier frequency.

Optionally, the first message may be a radio resource control RRC) connection reconfiguration message.

Step 202: The terminal receives the downlink signals from the source base station and the target base station based on the first indication.

After receiving the first indication, the terminal may directly configure a bearer on a target base station side, and monitor downlink control information (DCI), to receive the downlink signal from the target base station.

Based on this method, the terminal may receive the downlink signals from the source base station and the target base station in a handover process. For example, when the terminal needs to receive the downlink signal from the target base station while receiving the downlink signal from the source base station in the handover process, the terminal receives the downlink signals from the source base station and the target base station. When receiving no downlink signal from the target base station, the terminal receives the downlink signal (where the downlink signal carries downlink data) only from the source base station. In addition, after handover is completed, the terminal receives the downlink signal (where the downlink signal carries downlink data) only from the target base station, so that the terminal can still receive the downlink signal from the source base station in the handover process. Therefore, downlink signal transmission interruption caused by the handover process may be reduced to 0 ms or nearly 0 ms. In other words, zero interruption or nearly zero interruption may be implemented.

In an implementation, the terminal may further send a first capability indication to the source base station, where the first capability indication is used to indicate that the terminal has an intra-frequency receiving capability. Based on the method, the source base station learns that the terminal has the intra-frequency receiving capability, so that the source base station may indicate, according to the foregoing step 201, the terminal to perform intra-frequency receiving.

In an implementation, the source base station may further send a fifth capability indication or a first permission indication to the terminal, where the indication is used to indicate that the source base station supports the terminal having the intra-frequency receiving capability in performing the intra-frequency receiving or allows the terminal having the intra-frequency receiving capability to perform the intra-frequency receiving.

In an implementation, the first message in step 201 may further include a start time point. In this case, in step 201, the terminal starts, at the start time point, to receive the downlink signals from the source base station and the target base station based on the first indication. For example, the start time point may indicate an $L^{th}$ symbol of an $N^{th}$ subframe of an $M^{th}$ system frame that uses a time point of the source base station as a reference, where M, N, and L are integers greater than or equal to 0.

In an implementation, the first message in step 201 may further include an end time point, and the terminal stops, at the end time point, receiving the downlink signals from the source base station and the target base station. Alternatively, the first message includes first duration. After the first duration from the start time point, the terminal stops receiving the downlink signals from the source base station and the target base station.

In an implementation, in step 202, that the terminal receives the downlink signals from the source base station and the target base station based on the first indication specifically includes: The terminal configures at least two processing resources based on the first indication, where one processing resource includes a baseband resource and a fast Fourier transformation (FFT), and the at least two processing resources correspond to a same carrier frequency. The terminal receives the downlink signal from the source base station by using a first processing resource in the at least two processing resources, and receives the downlink signal from the target base station by using a second processing resource in the at least two processing resources, where the first processing resource is different from the second processing resource. Based on the method, the at least two processing resources are configured for the terminal, where the first processing resource may be used to receive the downlink signal from the source base station, and the second processing resource may be used to receive the downlink signal from the target base station. This implements receiving of the downlink signals from the source base station and the target base station.

Figure 3:
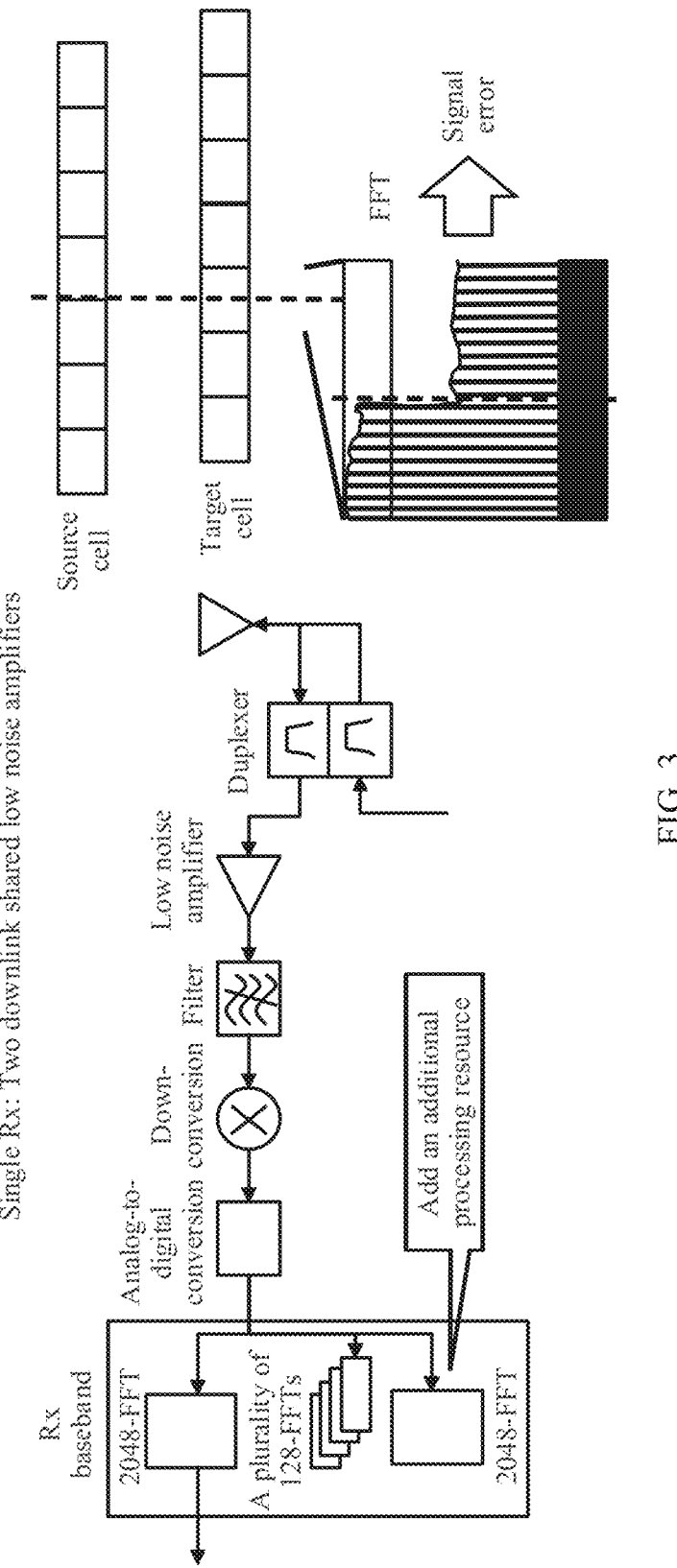
FIG. 3 is a schematic diagram of a processing resource allocation method according to this application when a terminal has a carrier aggregation capability.
Figure 4:
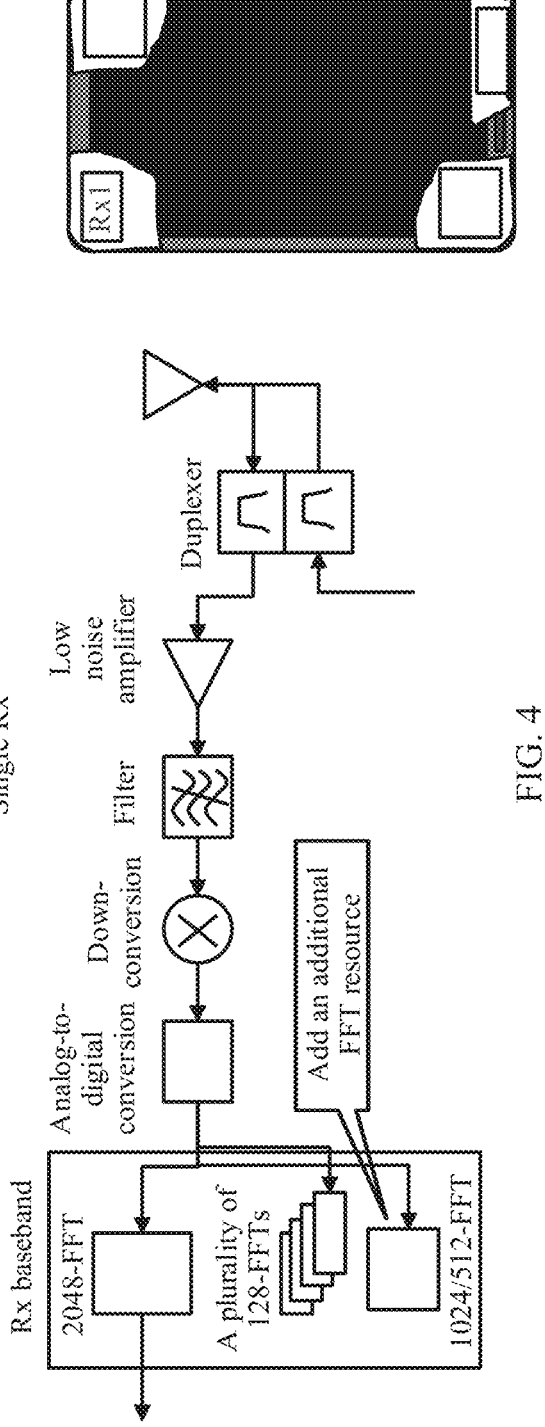
FIG. 4 is a schematic diagram of a processing resource allocation method according to this application when a terminal does not have a carrier aggregation capability.

With reference to FIG. 3 and FIG. 4, the following uses an example to describe a specific implementation of allocating processing resources.

FIG. 3 is a schematic diagram of a processing resource allocation method used when a terminal has a carrier aggregation (CA) capability. If the terminal has the carrier aggregation capability, a bandwidth of a baseband resource included in the first processing resource may be the same as a bandwidth of a baseband resource included in the second processing resource, and a size of an FFT corresponding to the first processing resource is the same as a size of an FFT corresponding to the second processing resource.

The terminal having the carrier aggregation capability refers to a terminal that can support carrier aggregation. In a downlink, the terminal having the carrier aggregation capability can receive signals on different carriers. Therefore, the terminal includes a plurality of processing resources, where one processing resource includes an FFT and a baseband resource.

A plurality of processing resources may be configured for each receive antenna of the terminal. For example, if the terminal has two receive antennas (in other words, two receive antennas), configuring at least two processing resources means that one or more additional processing resources are added when one processing resource exists, that is, at least two processing resources need to be config- ured for each antenna. That each receive antenna is config- ured with two processing resources is used as an example. Referring to FIG. 3, each receive antenna is currently configured with one processing resource (including a 2048- point FFT and a baseband resource), and configuring two processing resources means that another processing resource is configured, where the another processing resource includes a 2048-point FFT and a baseband resource. In addition, the originally configured processing resource is used to receive a downlink signal of a source cell, and the additional processing resource is used to receive a downlink signal of a target cell. Alternatively, the originally config- ured processing resource is used to receive a downlink signal of a target cell, and the additional processing resource is used to receive a downlink signal of a source cell.

It should be noted that this solution is different from typical carrier aggregation. In typical carrier aggregation, a plurality of processing resources on a terminal correspond to different carrier frequencies, and these carriers are in differ- ent bands (band). However, in this solution, the plurality of processing resources correspond to a same carrier frequency. Therefore, the plurality of processing resources share a same radio frequency chain. As shown in FIG. 4, the radio frequency chain includes, but is not limited to, a duplexer, a low noise amplifier (LNA), a filter, a down converter, and an analog-digital converter (ADC). The two processing resources shown in FIG. 3 share the radio frequency chain. In addition, status update of the radio frequency chain affects receiving of the downlink signals of the source cell and the target cell by the terminal.

FIG. 4 is a schematic diagram of a processing resource allocation method used when a terminal does not have a carrier aggregation capability. For a terminal that does not have a carrier aggregation capability, to reduce costs and complexity of the terminal, low-cost asymmetric dual FFT may be designed, in other words, an additional processing resource is added. The processing resource includes a small- point FFT and a baseband resource.

In an implementation, when the terminal does not have the carrier aggregation capability, a bandwidth of a baseband resource included in the second processing resource is less than or equal to a bandwidth of a baseband resource included in the first processing resource, and a size of an FFT corresponding to the second processing resource is less than or equal to a size of an FFT corresponding to the first processing resource, where the bandwidth of the baseband resource included in the second processing resource is less than or equal to a preset bandwidth threshold. For example, referring to FIG. 4, each receive antenna of the terminal currently has one processing resource (in other words, the first processing resource), and then an additional processing resource (in other words, the baseband resource included in the second processing resource) of 5 MHz or 10 MHz is added for each receive antenna, where the preset bandwidth threshold is greater than or equal to 5 MHZ, or greater than or equal to 10 MHz. The second processing resource sup- ports time and frequency synchronization and power delay profile (PDP) estimation in a target cell, and information obtained by using the second processing resource may be shared with the FFT (which may be referred to as a primary FFT) corresponding to the first processing resource, so that the primary FFT can receive a downlink signal of the target cell. In addition, the size (a 1024-point FFT or a 512-point FFT in FIG. 4) of the FFT corresponding to the second processing resource is less than the size (a 2048-point FFT in FIG. 4) of the FFT corresponding to the first processing resource. When the size of the FFT corresponding to the second processing resource is less than the size of the FFT corresponding to the first processing resource, an additional filter needs to be added before the FFT corresponding to the second processing resource.

Because the size of the FFT corresponding to the first processing resource is different from the size of the FFT (which may be referred to as a secondary FFT) correspond- ing to the second processing resource, when the terminal receives signals from a source cell and the target cell, a bandwidth range in which the terminal works in the target cell needs to be limited. For example, a Msg2 scheduling resource may be limited. To be specific, scheduling of the Msg2 is performed within 5 MHz or 10 MHz. In a time period in which downlink signals are sent from the source cell and the target cell, a scheduling resource for data transmission in the target cell may be limited. For example, scheduling is performed within 5 MHz or 10 MHz.

In a possible implementation, a bandwidth of a PDCCH for scheduling a physical downlink shared channel (PDSCH) that carries the Msg2 may be a system bandwidth, and a bandwidth of the PDSCH used to send the Msg2 may be the foregoing 5 MHz or 10 MHz. Optionally, if the size of the FFT corresponding to the second processing resource is less than the size of the FFT corresponding to the first processing resource, before the terminal receives, from the target cell, the PDCCH that schedules the Msg2, the terminal receives, by using the FFT corresponding to the first pro- cessing resource, the PDCCH that schedules the Msg2.

In a possible implementation, the terminal selects a pre- amble from a first preamble set and sends the preamble to the target cell, where the first preamble set is used for a terminal that supports a small-point FFT.

In a possible implementation, the target cell indicates, to the terminal by using the source cell, a bandwidth or a resource set of the PDCCH that schedules the Msg2, and the terminal receives, on the indicated bandwidth or resource set, the PDCCH that schedules the Msg2.

It should be noted that in a new radio (NR) system, a minimum cell system bandwidth is 100 M. However, due to a limitation of a terminal capability and consideration of terminal power consumption, a concept of a bandwidth part (BWP) is introduced, and a terminal can work only in a specific bandwidth. When handover is performed between NR base stations, it is difficult for the terminal to have a capability of receiving the downlink signals of the source cell and the target cell. Therefore, a problem of data trans- mission interruption may be resolved by using the method in the embodiment shown in FIG. 4. A specific implementation is as follows. The terminal reports an asymmetric FFT capability. NR is used as an example for description, for example, a primary FFT is a 4096-point FFT, and a second- ary FFT is a 1024-point FFT. When the terminal receives the downlink signals of the source cell and the target cell, a bandwidth range in which the terminal receives data in the target cell or a new secondary cell may be limited.

Optionally, when reporting the asymmetric FFT capabil- ity, the terminal may report some or all of the following information: a size of the primary FFT and a size of the secondary FFT, a bandwidth that supports receiving a signal of the secondary cell, a bandwidth for receiving a signal of the target cell during handover, and the like.

In still another implementation, when the terminal does not have a carrier aggregation capability, an implementation similar to that shown in FIG. 3 may also be used to additionally add at least one same processing resource (in other words, the second processing resource), where the processing resource includes an FFT and a baseband resource that are same as an FFT and a baseband resource that are included in a current processing resource (in other words, the first processing resource) of an antenna of the terminal. The second processing resource supports time and frequency synchronization and PDP estimation in the target cell, and information obtained by using the second processing resource may be shared with the FFT (which may be referred to as a primary FFT) corresponding to the first processing resource, so that the primary FFT can receive a downlink signal of the target cell.

In addition, in mobile communications, because a quantity of ADC quantization bits is limited, a received signal needs to be amplified or attenuated to a specific amplitude that is suitable for ADC quantization. Because of a fading change of a channel, an amplitude of a signal received by the terminal through the channel changes with time. Therefore, on a receiver side, there is a function unit called automatic gain control (AGC). A function of the function unit is measuring a total amplitude of the received signal, and continuously adjusting a multiple of a gain over time, so that an amplitude of a signal that reaches an ADC through a radio frequency link falls within a proper input level range of the ADC. The gain adjustment is completed at a specific time point. Usually, the time point is determined by using a boundary of a frame, a subframe, or a symbol of a source cell as a reference.

FIG. 3 is used as an example. It is assumed that signals that arrive at the terminal from the source cell and the target cell are not synchronous, or a synchronization delay difference is relatively large, for example, greater than a length of one cyclic prefix (CP). When the terminal performs AGC adjustment based on the boundary of the frame, the subframe, or the symbol of the source cell, for the target cell, a signal amplitude change occurs in an orthogonal frequency division multiplexing (OFDM) symbol. For the OFDM symbol, amplitudes of received signals before and after the AGC adjustment are greatly different. Consequently, a decoding error may occur after FFT is performed. Especially, when the affected OFDM symbol includes a cell-specific reference signal (CRS), the impact is greater.

To resolve the foregoing problem, in this application, in a time period in which the foregoing problem may occur, the terminal may avoid adjusting an AGC gain, or reduce a frequency of adjusting an AGC gain.

In an implementation, the first indication included in the first message in step 201 is further used to indicate not to adjust the AGC gain. In this case, the terminal may not adjust the AGC gain based on the first indication. Alternatively, the first message in step 201 further includes a second indication, and the second indication is used to indicate not to adjust the AGC gain. In this case, the terminal may not adjust the AGC gain based on the second indication. Optionally, the terminal may further send a second capability indication to the source base station, where the second capability indication is used to indicate that the terminal has a capability of not adjusting the AGC gain.

It should be noted that, if the first message includes a start time point, the terminal may not adjust the AGC gain from the start time point. If the first message includes an end time point or first duration, the terminal may stop, after the end time point or the first duration from the start time point, not adjusting the AGC gain, that is, may start to adjust the AGC gain in an original manner.

In still another implementation, the first indication is further used to indicate a fading margin, and the terminal sets a fixed AGC gain based on the fading margin. Alternatively, the first message further includes a third indication, the third indication is used to indicate a fading margin, and the terminal sets a fixed AGC gain based on the fading margin. Optionally, the terminal may further send a third capability indication to the source base station, where the third capability indication is used to indicate that the terminal has a capability of setting the fixed AGC gain based on the fading margin.

It should be noted that, if the first message includes a start time point, the terminal may set the fixed AGC gain based on the fading margin from the start time point. If the first message includes an end time point or first duration, the terminal may stop, after the end time point or the first duration from the start time point, setting the fixed AGC gain based on the fading margin, that is, may start to adjust the AGC gain in an original manner.

In an implementation, before step 201, the terminal may further send a fourth capability indication to the source base station, where the fourth capability indication is used to indicate that the terminal has a capability of sending a preamble to the target base station after second duration after the terminal device receives a handover command (where the handover command is carried in the first message). Alternatively, the fourth capability indication is used to indicate a value of the second duration, and the second duration is a time period in which the terminal processes the handover command. Further, the source base station may send the fourth capability indication to the target base station, so that the target base station can know when to start to send the downlink signal to the terminal.

It should be noted that "first", "second", "third", "fourth", and "fifth" in this application are only used to distinguish between different nouns, and do not constitute a limitation on meanings of the nouns.

It may be understood that, in the foregoing method embodiment, the method implemented by the terminal may also be implemented by a component (for example, a chip or a circuit) that can be used in the terminal. This is not limited in this embodiment of this application.

Optionally, the first message may further include a power difference indication, used to indicate a power difference for scheduling downlink data transmission between the source base station and the target base station, to assist the terminal in using an advanced receiver.

Figure 5:
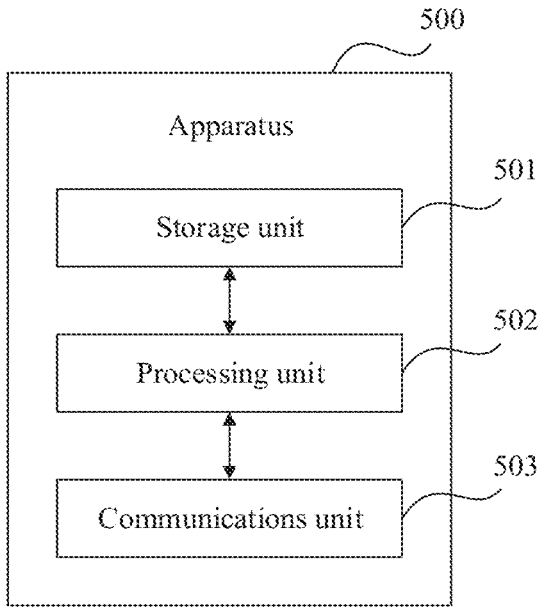
FIG. 5 is a schematic diagram of an apparatus according to this application.

FIG. 5 is a possible example block diagram of an apparatus according to an embodiment of the present invention. The apparatus 500 may exist in a form of software or hardware. The apparatus 500 may include a processing unit 502 and a communications unit 503. In an implementation, the communications unit 503 may include a receiving unit and a sending unit. The processing unit 502 is configured to control and manage an action of the apparatus 500. The communications unit 503 is configured to support communication between the apparatus 500 and another network entity. The apparatus 500 may further include a storage unit 501, configured to store program code and data of the apparatus 500.

The processing unit 502 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit 502 may implement or execute various example logical blocks, modules, and circuits described with reference to content disclosed in the present invention. The processor may be a combination of processors implementing a computing function, for example, a combination of one or more microprocessors, or a combination of the DSP and a microprocessor. The communications unit 503 may be a communications interface, a transceiver, a transceiver circuit, or the like, where the communications interface is a general name, and may include a plurality of interfaces during specific implementation. The storage unit 501 may be a memory.

In an embodiment, the apparatus 500 may be a terminal, or may be a chip in a terminal. The terminal may be configured to implement operations performed by the terminal in the foregoing embodiments. Specifically, for example, the communications unit 503 includes the sending unit and the receiving unit. The receiving unit is configured to receive a first message from the source base station, where the first message includes a first indication, and the first indication is used to indicate the terminal to receive downlink signals from the source base station and the target base station on a same carrier frequency. The processing unit is configured to receive the downlink signals from the source base station and the target base station based on the first indication through the receiving unit.

In a possible implementation, the processing unit is specifically configured to configure at least two processing resources based on the first indication, where one processing resource includes a baseband resource and a fast Fourier transformation FFT, and the at least two processing resources correspond to a same carrier frequency. The receiving unit is specifically configured to: receive the downlink signal from the source base station by using a first processing resource in the at least two processing resources, and receive the downlink signal from the target base station by using a second processing resource in the at least two processing resources, where the first processing resource is different from the second processing resource.

In a possible implementation, if the terminal has a carrier aggregation capability, a bandwidth of a baseband resource included in the first processing resource is the same as a bandwidth of a baseband resource included in the second processing resource, and a size of an FFT corresponding to the first processing resource is the same as a size of an FFT corresponding to the second processing resource. Alternatively, if the terminal does not have a carrier aggregation capability, a bandwidth of a baseband resource included in the second processing resource is less than or equal to a bandwidth of a baseband resource included in the first processing resource, and a size of an FFT corresponding to the second processing resource is less than or equal to a size of an FFT corresponding to the first processing resource, where the bandwidth of the baseband resource included in the second processing resource is less than or equal to a preset bandwidth threshold.

In a possible implementation, the sending unit is configured to send a first capability indication to the source base station, where the first capability indication is used to indicate that the terminal has an intra-frequency receiving capability.

In a possible implementation, the processing unit is further configured to not adjust an automatic gain control AGC gain based on the first indication. Alternatively, the first message further includes a second indication, and the processing unit is further configured to not adjust an AGC gain based on the second indication.

In a possible implementation, the sending unit is configured to send a second capability indication to the source base station, where the second capability indication is used to indicate that the terminal has a capability of not adjusting the AGC gain.

In a possible implementation, the first indication is further used to indicate a fading margin, and the processing unit is further configured to set a fixed AGC gain based on the fading margin. Alternatively, the first message further includes a third indication, the third indication is used to indicate a fading margin, and the processing unit is further configured to set a fixed AGC gain based on the fading margin.

In a possible implementation, the sending unit is configured to send a third capability indication to the source base station, where the third capability indication is used to indicate that the terminal has a capability of setting the fixed AGC gain based on the fading margin.

In a possible implementation, the first message further includes a start time point, and the processing unit is specifically configured to start, at the start time point, to receive the downlink signals from the source base station and the target base station based on the first indication through the receiving unit.

In a possible implementation, the first message further includes an end time point, and the processing unit is further configured to stop, at the end time point, receiving the downlink signals from the source base station and the target base station. Alternatively, the first message further includes first duration, and the processing unit is further configured to stop, after the first duration from the start time point, receiving the downlink signals from the source base station and the target base station.

In a possible implementation, the first message is a radio resource control RRC connection reconfiguration message.

In an embodiment, the apparatus 500 may be a base station, or may be a chip in a base station. The base station may be configured to implement operations performed by the source base station in the foregoing embodiments. Specifically, for example, the communications unit 503 includes the sending unit and the receiving unit. The processing unit is configured to generate a first message, where the first message includes a first indication, and the first indication is used to indicate the terminal to receive downlink signals from the source base station and the target base station on a same carrier frequency. The sending unit is configured to send the first message to the terminal.

In a possible implementation, the receiving unit is configured to receive a first capability indication from the terminal, where the first capability indication is used to indicate that the terminal has an intra-frequency receiving capability.

In a possible implementation, the first indication is further used to indicate the terminal not to adjust an AGC gain. Alternatively, the first message further includes a second indication, where the second indication is used to indicate the terminal not to adjust an AGC gain.

In a possible implementation, the receiving unit is configured to receive a second capability indication from the terminal, where the second capability indication is used to indicate that the terminal has a capability of not adjusting the AGC gain.

In a possible implementation, the source base station receives a third capability indication from the terminal, where the third capability indication is used to indicate that the terminal has a capability of setting a fixed AGC gain based on a fading margin.

In a possible implementation, the first message further includes a start time point, so that the terminal may start, at the start time point, to receive the downlink signals from the source base station and the target base station based on the first indication.

In a possible implementation, the first message further includes an end time point, so that the terminal can stop, at the end time point, receiving the downlink signals from the source base station and the target base station. Alternatively, the first message further includes first duration, so that after the first duration from the start time point, the terminal can stop receiving the downlink signals from the source base station and the target base station.

In a possible implementation, the first message is a radio resource control RRC connection reconfiguration message.

For beneficial effects of the foregoing apparatus embodiments, refer to related descriptions in the foregoing method embodiment. Details are not described herein again.

Figure 6:
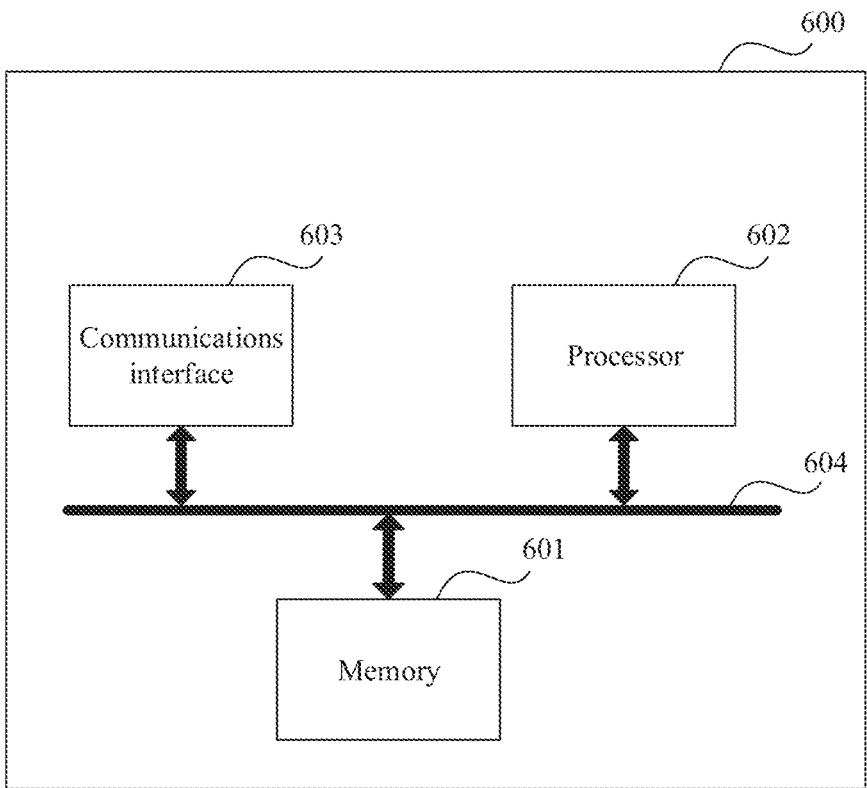
FIG. 6 is a schematic diagram of another apparatus according to this application.

FIG. 6 is a schematic diagram of an apparatus according to this application. The apparatus may be a terminal or a source base station in an embodiment of this application, or may be a component that can be used for a terminal or a source base station. An apparatus 600 includes a processor 602, a communications interface 603, and a memory 601. Optionally, the apparatus 600 may further include a bus 604. The communications interface 603, the processor 602, and the memory 601 may be connected to each other through the communication line 604. The communication line 604 may be a peripheral component interconnect (PCI) bus, an extended industry standard architecture (EISA) bus, or the like. The communication line 604 may be classified into an address bus, a data bus, a control bus, and the like. For ease of representation, only one thick line is used to represent the bus in FIG. 6, but this does not mean that there is only one bus or only one type of bus.

The processor 602 may be a CPU, a microprocessor, an ASIC, or one or more integrated circuits configured to control program execution in the solutions of this application.

The communications interface 603 may be any type of apparatus using a transceiver, and is configured to communicate with another device or a communications network such as the Ethernet, a radio access network (RAN), a wireless local area network (WLAN), or a wired access network.

The memory 601 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 601 is not limited thereto. A memory may exist independently, and is connected to a processor through the communication line 604. Alternatively, the memory may be integrated into the processor.

The memory 601 is configured to store computer-executable instructions for executing the solutions in this application, and the processor 602 controls the execution. The processor 602 is configured to execute the computer-executable instructions stored in the memory 601, to implement the downlink signal receiving method provided in the foregoing embodiments of this application.

Optionally, the computer-executable instructions in this embodiment of this application may also be referred to as application program code. This is not specifically limited in this embodiment of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information into the storage medium. Alternatively, the storage medium may further be integrated into a processor. The processor and the storage medium may be disposed in an ASIC, and the ASIC may be disposed in a terminal. Optionally, the processor and the storage medium may alternatively be disposed in different components of a terminal.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, it is clear that various modifications and combinations may be made to this application without departing from the scope of this application. Correspondingly, the specification and accompanying drawings are merely example descriptions of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies in this application.

What is claimed is:

1. A downlink signal receiving method, wherein the method comprises:

sending, by a terminal, a first capability indication to a source base station, wherein the first capability indication indicates that the terminal has an intra-frequency receiving capability;

in response to the first capability indication indicating that the terminal has an intra-frequency receiving capability, receiving, by the terminal and from the source base station, a first message that comprises a first indication indicating the terminal to receive, during a handover process and on a same frequency, both a downlink signal from the source base station and a downlink signal from a target base station; and receiving, by the terminal, during the handover process, the downlink signal from the source base station and the downlink signal from the target base station based on the first indication, and wherein the method further comprises:

setting, by the terminal and based on a fading margin, a fixed automatic gain control (AGC) gain applied to the downlink signal received from the source base station and the downlink signal received from the target base station, wherein the first indication indicates the fading margin or the first message further comprises a third indication that indicates the fading margin; and sending, by the terminal, a third capability indication to the source base station, wherein the third capability indication indicates that the terminal has a capability of setting the fixed AGC gain based on a fading margin.

2. The method according to claim 1, wherein the receiving, by the terminal, the downlink signals from the source base station and the target base station based on the first indication comprises:

configuring, by the terminal, at least two processing resources based on the first indication, wherein each processing resource of the at least two processing resources comprises a baseband resource and a fast fourier transformation (FFT) and the at least two processing resources correspond to a same carrier frequency;

receiving, by the terminal, the downlink signal from the source base station by using a first processing resource in the at least two processing resources; and receiving, by the terminal, the downlink signal from the target base station by using a second processing resource in the at least two processing resources, wherein the first processing resource is different from the second processing resource.

3. The method according to claim 2, wherein if the terminal has a carrier aggregation capability, a bandwidth of the baseband resource comprised in the first processing resource is the same as a bandwidth of the baseband resource comprised in the second processing resource, and a size of the FFT corresponding to the first processing resource is the same as a size of the FFT corresponding to the second processing resource; or if the terminal does not have a carrier aggregation capability, a bandwidth of the baseband resource comprised in the second processing resource is less than or equal to a bandwidth of the baseband resource comprised in the first processing resource, and a size of the FFT corresponding to the second processing resource is less than or equal to a size of the FFT corresponding to the first processing resource, wherein the bandwidth of the baseband resource comprised in the second processing resource is less than or equal to a preset bandwidth threshold.

4. The method according to claim 1, wherein the method further comprises:

skipping adjusting, by the terminal, an automatic gain control (AGC) gain applied to the downlink signal received from the source base station and the downlink signal received from the target base station during the handover process;

wherein:

the skipping adjusting, by the terminal, an automatic gain control (AGC) gain applied to the downlink signal received from the source base station and the downlink signal received from the target base station during the handover process is performed based on the first indication; or the skipping adjusting, by the terminal, an automatic gain control (AGC) gain applied to the downlink signal received from the source base station and the downlink signal received from the target base station during the handover process is performed based on a second indication, wherein the first message further comprises the second indication.

5. The method according to claim 4, wherein the method further comprises:

sending, by the terminal, a second capability indication to the source base station, wherein the second capability indication indicates that the terminal has a capability of skipping adjusting the AGC gain.

6. The method according to claim 1, wherein the first message further comprises a start time point; and the receiving, by the terminal, the downlink signal from the source base station and the downlink signal from the target base station based on the first indication comprises:

starting, by the terminal at the start time point, to receive the downlink signal from the source base station and the downlink signal from the target base station based on the first indication.

7. The method according to claim 6, wherein the method further comprises:

stopping, by the terminal at an end time point, receiving the downlink signal from the source base station and the downlink signal from the target base station, wherein the first message further comprises the end time point; or stopping, by the terminal after a first duration from the start time point, receiving the downlink signals from the source base station and the target base station, wherein the first message further comprises the first duration.

8. A downlink signal receiving method, wherein the method comprises:

receiving, by a source base station, a first capability indication from a terminal, wherein the first capability indication indicates that the terminal has an intra-frequency receiving capability;

in response to the first capability indication indicating that the terminal has an intra-frequency receiving capability, generating, by the source base station, a first message that comprises a first indication indicating the terminal to receive, during a handover process and on a same frequency, both a downlink signal from the source base station and a downlink signal from a target base station; and sending, by the source base station, the first message to the terminal, and wherein the method further comprises:

receiving, from the terminal, a third capability indication, wherein the third capability indication indicates that the terminal has a capability of setting a fixed automatic gain control (AGC) gain applied to the downlink signal from the source base station and the downlink signal from the target base station, wherein the fixed AGC gain is set based on a fading margin that is indicated by first indication or indicated by a third indication in the first message.

9. The method according to claim 8, wherein the method further comprising:

indicating, by the source base station, to the terminal to skip adjusting an automatic gain control (AGC) applied to the downlink signal received from the source base station and the downlink signal received from the target base station during the handover process;

wherein:

the indicating, by the source base station, to the terminal to skip adjusting an automatic gain control (AGC) applied to the downlink signal received from the source base station and the downlink signal received from the target base station during the handover process is performed based on the first indication; or the indicating, by the source base station, to the terminal to skip adjusting an automatic gain control (AGC) applied to the downlink signal received from the source base station and the downlink signal received from the target base station during the handover process is performed based on a second indication, wherein the first message further comprises the second indication.

10. The method according to claim 9, wherein the method further comprises:

receiving, by the source base station, a second capability indication from the terminal, wherein the second capability indication indicates that the terminal has a capability of skipping adjusting an AGC gain.

11. A communication apparatus, wherein the communication apparatus comprises at least one processor; and the at least one processor is configured to perform operations comprising:

sending a first capability indication to a source base station, wherein the first capability indication indicates that a terminal has an intra-frequency receiving capability;

in response to the first capability indication indicating that the terminal has an intra-frequency receiving capability, receiving, from the source base station, a first message that comprises a first indication indicating the terminal to receive, during a handover process and on a same frequency, both a downlink signal from the source base station and a downlink signal from a target base station; and receiving, during the handover process, the downlink signal from the source base station and the downlink signal from the target base station based on the first indication, and wherein the operations further comprise:

setting, based on a fading margin, a fixed automatic gain control (AGC) gain applied to the downlink signal received from the source base station and the downlink signal received from the target base station, wherein the first indication indicates the fading margin or the first message further comprises a third indication that indicates the fading margin; and sending a third capability indication to the source base station, wherein the third capability indication indicates that the terminal has a capability of setting the fixed AGC gain based on a fading margin.

12. The communication apparatus according to claim 11, wherein the receiving the downlink signals from the source base station and the target base station based on the first indication comprises:

configuring at least two processing resources based on the first indication, wherein each processing resource of the at least two processing resources comprises a baseband resource and a fast fourier transformation (FFT) a and the at least two processing resources correspond to a same carrier frequency;

receiving the downlink signal from the source base station by using a first processing resource in the at least two processing resources; and receiving the downlink signal from the target base station by using a second processing resource in the at least two processing resources, wherein the first processing resource is different from the second processing resource.

13. The communication apparatus according to claim 11, wherein the operations comprise:

based on the first indication or a second indication, skipping adjusting an automatic gain control (AGC) gain applied to the downlink signal received from the source base station and the downlink signal received from the target base station during the handover process, wherein the first message further comprises the second indication.

14. The communication apparatus according to claim 13, wherein the operations comprise:

sending a second capability indication to the source base station, wherein the second capability indication indicates that the terminal has a capability of skipping adjusting the AGC gain.

15. The communication apparatus according to claim 11, wherein the first message further comprises a start time point; and the receiving the downlink signal from the source base station and the downlink signal from the target base station based on the first indication comprises:

starting, at the start time point, to receive the downlink signal from the source base station and the downlink signal from the target base station based on the first indication.

16. The communication apparatus according to claim 11, wherein the operations further comprise:

receiving a second capability indication from the terminal, wherein the second capability indication indicates that the terminal has a capability of skipping adjusting an AGC gain.

17. A communication apparatus, wherein the communication apparatus comprises at least one processor; and the at least one processor is configured to perform operations comprising:

receiving a first capability indication from a terminal, wherein the first capability indication indicates that the terminal has an intra-frequency receiving capability;

in response to the first capability indication indicating that the terminal has an intra-frequency receiving capability, generating a first message that comprises a first indication indicating the terminal to receive, during a handover process and on a same frequency, both a downlink signal from a source base station and a downlink signal from a target base station; and sending the first message to the terminal, and wherein the operations further comprises:

receiving, from the terminal, a third capability indication, wherein the third capability indication indicates that the terminal has a capability of setting a fixed automatic gain control (AGC) gain applied to the downlink signal from the source base station and the downlink signal from the target base station, wherein the fixed AGC gain is set based on a fading margin that is indicated by first indication or indicated by a third indication in the first message.

18. The communication apparatus according to claim 17, wherein the operations comprise:

indicating to the terminal to skip adjusting an automatic gain control (AGC) applied to the downlink signal received from the source base station and the downlink signal received from the target base station during the handover process;

wherein:

the indicating to the terminal to skip adjusting an automatic gain control (AGC) applied to the downlink signal received from the source base station and the downlink signal received from the target base station during the handover process is performed based on the first indication; or the indicating to the terminal to skip adjusting an automatic gain control (AGC) applied to the downlink signal received from the source base station and the downlink signal received from the target base station during the handover process is performed based on a second indication, wherein the first message further comprises the second indication.

* * * * *